Patented June 19, 1951

2,557,772

UNITED STATES PATENT OFFICE 2,557,772

N-[2-METHOXY-3-(1,2-DICARBOXYETHYL-THIOMERCURI)-PROPYL]-PHTHALAMIDE

Robert S. Shelton, Mariemont, Josselyn L. Farmer, Cincinnati, and Charles H. Tilford, Silverton, Ohio, assignors to The Wm. S. Merrell Company, Cincinnati, Ohio, a corporation of Delaware No Drawing. Application March 1, 1950,
Serial No. 147,133

1 Claim. (Cl. 260—434)

This invention relates to a chemical compound N-[2-methoxy-3-(1,2-dicarboxyethylthiomercuri)-propyl]-phthalamide of the formula

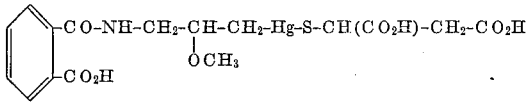

It is useful as a diuretic. It will ordinarily be produced and used in the form of its trisodium salt. It is characterized by relative freedom from toxicity, by capacity of administration intravenously, intramuscularly and subcutaneously, and by stability in aqueous solution. It is quite soluble in water, giving solutions which are stable at both room and icebox temperature. Administration of the compound for diuresis is based on its mercury content, and is in accordance with common practice with the presently used mercurial diuretics such as Mersalyl and Merbaphen.

The new compound is readily prepared by reaction of N-[2-methoxy-3-hydroxymercuripropyl]-phthalamide with thiomalic acid and sodium hydroxide. Its preparation is illustrated by the following example.

Example

A solution of 7.5 parts of thiomalic acid, 6 parts of sodium hydroxide and 180 parts of 55% methanol was added to a stirred suspension of 23 parts of N-[2-methoxy-3-hydroxy-mercuripropyl]-phthalamide in 80 parts of methanol over a period of 30 minutes at about 18°. The mixture was allowed to stand at room temperature for 2-3 hours, filtered from the small amount of insoluble material, and diluted with about 160 parts of ethanol. The solution was cooled to 0° during the addition of 160 parts of isopropanol, and the precipitate that formed was dried over $CaCl_2$ in the vacuum to give a white solid which decomposes without melting at about 160° C.

We claim:

N-[2-methoxy-3-(1,2-dicarboxyethylthiomercuri)-propyl]-phthalamide of the formula

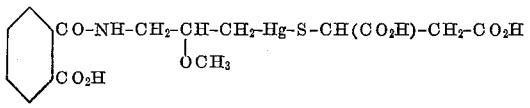

ROBERT S. SHELTON.
JOSSELYN L. FARMER.
CHARLES H. TILFORD.

REFERENCES CITED

The following references are of record in the file of this patent:

UNITED STATES PATENTS

| Number | Name | Date |
| --- | --- | --- |
| 1,672,615 | Kharasch | June 5, 1928 |

FOREIGN PATENTS

| Number | Country | Date |
| --- | --- | --- |
| 619,515 | Great Britain | Mar. 10, 1949 |